United States Patent [19]
Maynard

[11] 3,785,475
[45] Jan. 15, 1974

[54] MAGNETICALLY CONTROLLED NON-SYNCHRONOUS CONVEYOR SYSTEM

[75] Inventor: John F. Maynard, Chesterfield, Ind.

[73] Assignee: Magna-Matic Systems, Inc., Greensburgh, Ind.

[22] Filed: Mar. 9, 1972

[21] Appl. No.: 233,109

[52] U.S. Cl. .................................. 198/41, 198/19
[51] Int. Cl. ............................................. B65g 47/00
[58] Field of Search .............. 198/41, 172 R, 172 S, 198/19; 104/172 R, 172 C, 172 S

[56] References Cited
UNITED STATES PATENTS

| | | | |
|---|---|---|---|
| 3,039,176 | 6/1962 | Deschenes et al. | 104/88 |
| 3,621,979 | 11/1971 | Kraeft | 198/41 |
| 2,767,823 | 10/1956 | Beamish | 198/41 |
| 3,610,161 | 10/1971 | Wishart et al. | 198/41 |
| 3,083,650 | 4/1963 | Peras | 104/172 S |
| 3,353,499 | 11/1967 | Sutherland | 104/172 S |
| R25,886 | 10/1965 | Cargill | 29/200 A |
| 2,824,638 | 2/1958 | De Burgh | 198/41 |
| 3,044,418 | 7/1962 | Beers | 104/172 R |
| 3,646,656 | 3/1972 | Zilahy et al. | 198/19 X |

Primary Examiner—Evon C. Blunk
Assistant Examiner—Joseph E. Valenza
Attorney—Maurice A. Weikart

[57] ABSTRACT

Disclosed is a conveyor system utilizing an endless, magnetically permeable chain which moves in a path adjacent a series of work stations. Pallets, carrying workpieces to be processed at the stations are fastened to the chain for movement with it and detached from the chain and braked to a positive, accurately positioned stop by the selective energization of electromagnets carried by each of the pallets. Magnetic means is provided at the trailing margin of each pallet to halt a following pallet before physical contact occurs.

15 Claims, 16 Drawing Figures

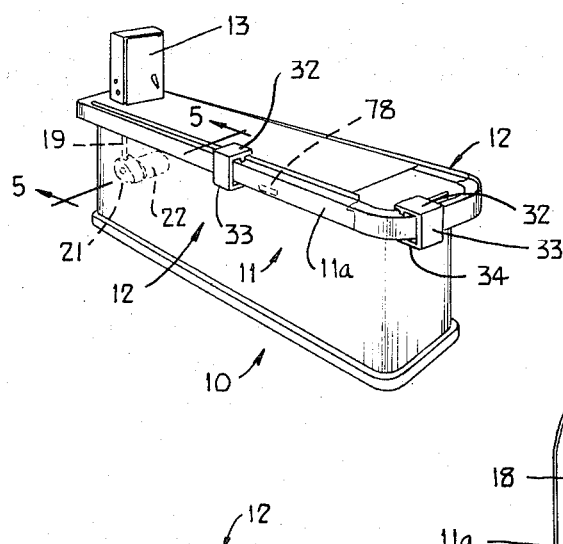
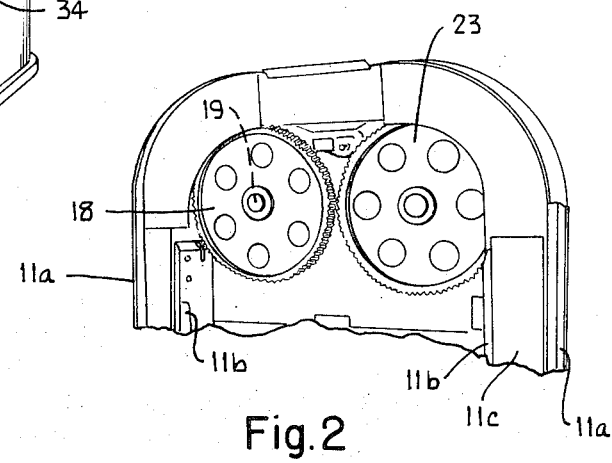
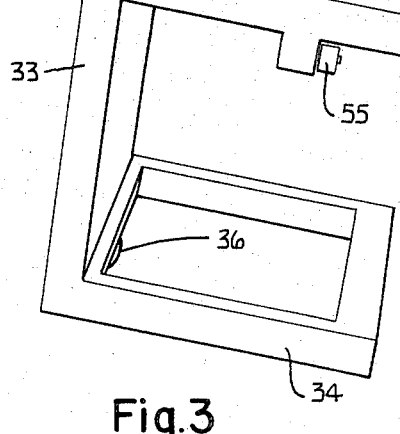
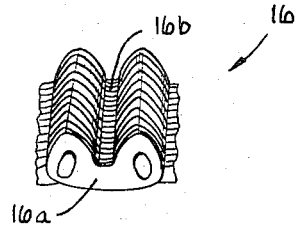
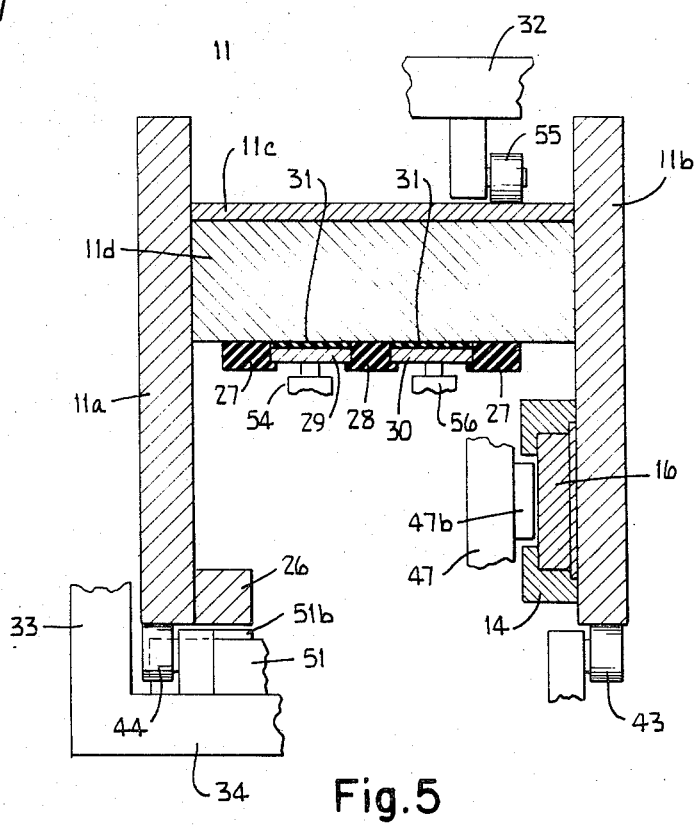

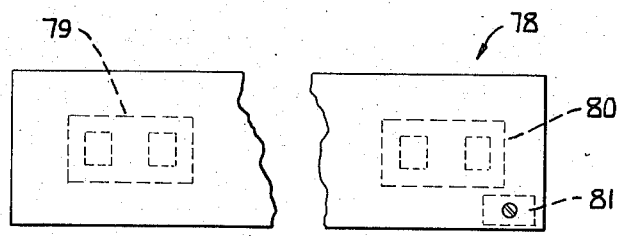
Fig. 11
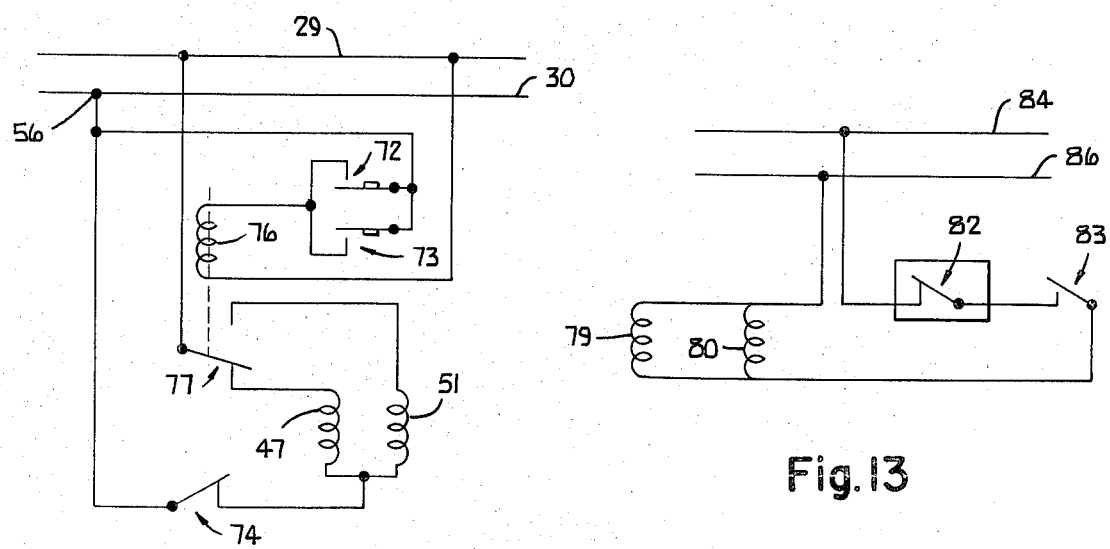
Fig. 12
Fig. 13
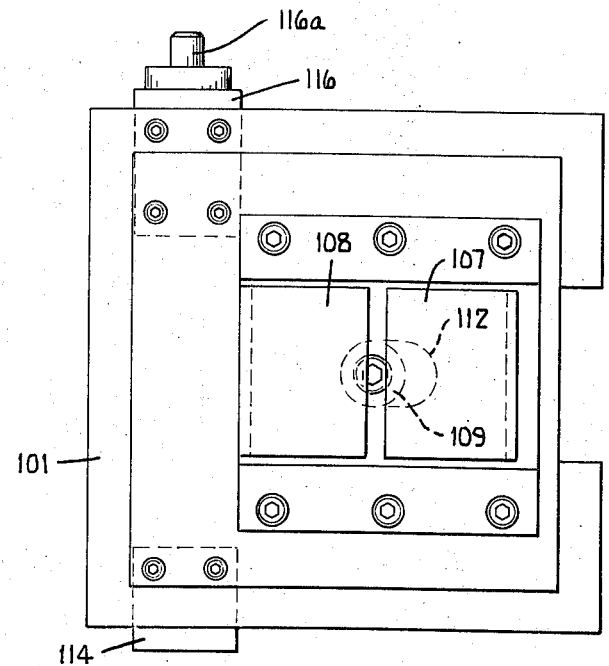
Fig. 14

3,785,475

MAGNETICALLY CONTROLLED NON-SYNCHRONOUS CONVEYOR SYSTEM

BACKGROUND OF THE INVENTION

The use of means for conveying workpieces through a plurality of work-performing stations is a well known feature of modern automatic production machinery. In some applications it is necessary to convey the workpiece to variously spaced stations where independent work-performing mechanisms process the workpieces. Such applications require a non-synchronized transfer system, that is, a transfer system in which the advance of each workpiece from one station to the next is not synchronized with the advancement of any other workpiece. One form of such non-synchronized conveyor or transfer system is disclosed in Deschenes et al., U.S. Pat. No. 3,039,176. Another form of non-synchronized system, utilizing a uniformly moving flexible member to which pallets are selectively clutched and unclutched is disclosed in Cargill U.S. Pat. No. Re. 25,886.

The structure of the present invention also utilizes a uniformly moving flexible member, which is magnetically permeable, and incorporates a controlled magnetic means for selectively fastening and unfastening, and positively halting, the pallets with respect to the moving flexible member. Magnetic means are provided on each pallet for stopping a following pallet as soon as it reaches a predetermined proximity to a preceding pallet. Because the magnets are electrically controlled, a simple disconnect switch can be utilized to detach and remove a pallet from the moving member and from the stationary brake rail without shutting down the system. The pallets are provided, by means of their magnetic attachment to the moving, flexible member, with a positive drive, yet one that will slip readily should an obstruction to pallet movement occur thereby enhancing operator safety.

BRIEF DESCRIPTION OF THE DRAWINGS

FIG. 1 is a perspective view of an apparatus embodying the present invention.

FIG. 2 is a perspective view of one end of the apparatus shown in FIG. 1, with a portion of the overlying cover removed.

FIG. 3 is a perspective view of the frame component of a pallet utilized in the apparatus shown in FIG. 1.

FIG. 4 is a fragmentary, perspective view of a portion of the chain utilized in the system.

FIG. 5 is a sectional view of the guiding track or rail assembly on which the pallets move, and taken generally along the line 5—5 of FIG. 1.

FIG. 11 is a front view of the stop-bar component of the invention.

FIG. 12 is a schematic wiring diagram of the control circuit incorporated in the control module component.

FIG. 13 is a schematic wiring diagram illustrating the control circuit of the stop-bar component shown in FIG. 11.

FIG. 14 is a top plan view of a modified form of the control module.

DESCRIPTION OF THE PREFERRED EMBODIMENTS

Figure 6:
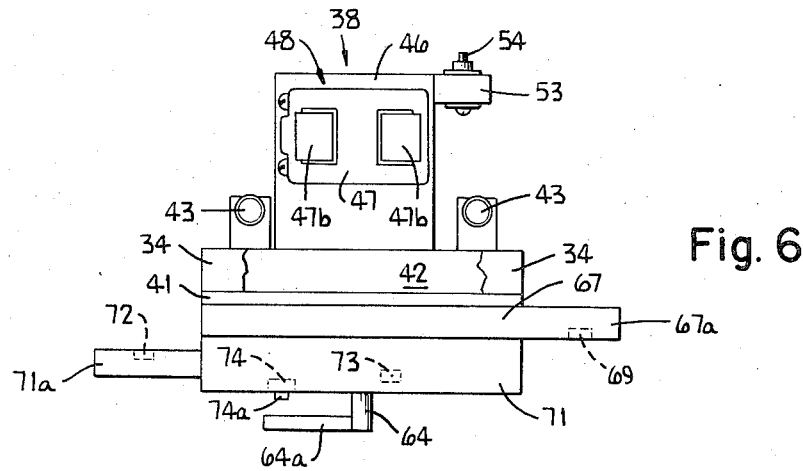
FIG. 6 is a side view of the control module component of the pallets.

Referring initially to FIG. 1, the system of the present invention may be embodied in a structure which includes a generally rectangular base indicated generally at 10, the base supporting a track assembly indicated generally at 11. Movably supported on the rack assembly are a series of pallets indicated generally at 12. Supported within the area circumscribed by the track 11 is a control box 13.

As may best be seen in FIG. 5, the track 11 is composed of an outer rail 11a and an inner or inside rail 11b. Spanning the two rails is a track plate 11c supported by track spacers 11d. Chain guides 14, extending along the inner face of the inside rail 11b, support in generally vertically position a flexible, magnetically permeable member taking the form of chain 16. The chain 16 forms an endless loop within the track 11 and is shown in detail in FIG. 4. The chain is of a conventional silent, or inverted tooth, type formed of a series of joined plates 16a having one or more central guiding grooves 16b intermediate its side margins.

As may best be seen in FIG. 2 the chain is driven by a drive sprocket 18, which, as may best be seen in FIG. 1, is power driven through a shaft 19 and a gear box 21 by electrical drive motor 22. As will be evident from FIG. 2 idler sprockets 23 are located at each corner of the track, the chain travelling around a quadrant of each of the sprockets.

Referring again to FIG. 5, the track assembly 11 is provided with a brake rail 26 formed of steel (magnetically permeable), the rail extending from the inner face of the steel side member 11a. Depending from the spacers 11d are clamps 27, formed of electrical insulating material, and these, together with the central insulator mount 28, support electrically conductive bus bars 29 and 30, the bus bars being electrically insulated from the spacers by means of electrically insulating layer 31. The function of the electrical bus bars 29 and 30 and the brake rail 26 will be described subsequently.

Figure 10:
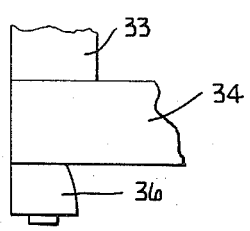
FIG. 10 is a fragmentary, enlarged showing of the frame component shown in FIG. 3 but illustrating the stationary portion of the latch on the frame which cooperates with the structure shown in FIG. 8.

Referring to FIG. 3, the pallet frame 12 is shown in detail and is composed of a top plate 32, a side plate 33 and a bottom or base rectangular portion 34. Depending from the lower margin of the portion 34 is a latch member 36. The latch member is shown in detail in FIG. 10 and is adapted to cooperate with a movable latching element 37 (FIGS. 6 and 8) which is carried by, and serves to fasten to the pallet frame, a control module assembly indicated generally at 38 which is shown in detail in FIGS. 6 and 7.

As may best be seen in FIG. 6, the control module comprises a base plate 41 which engages the underface of a base member 34 of the pallet frame. Extending upwardly from the base is a block fitting within the central opening bounded by the frame portion 34. Supported on the block are tracking rollers 43 on one side of the block and rollers 44 (FIG. 7) on the opposite side of the block. When the pallet is fitted on the track structure 11, the rollers 44 are adapted to engage the lower marginal surface of the outer member 11a, as shown in FIG. 5. Extending upwardly from the block 42 is a support member 46 which supports the coil 47 of a drive electromagnet indicated generally at 48. The electromagnet is provided with core or pole pieces 47b. The core members 47b of the drive electromagnet are adapted to extend into closely spaced relation with the chain 16 as will be evident from FIG. 5, the electromagnet 48 thus providing magnetic flux when energized, which links the magnetically permeable chain 16.

Figure 7:
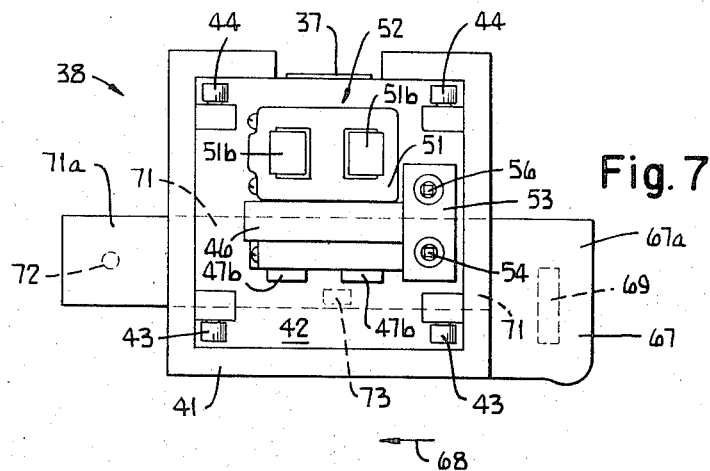
FIG. 7 is a top plan view of the structure shown in FIG. 6.

As may be seen in FIG. 7, the support member 46 has extending from its base the coil structure 51 of a brake electromagnet indicated generally at 52. The core members for the electromagnet are indicated at 51b. When energized, the electromagnet 52 is adpated to provide magnetic flux which links the underface of the brake bar 26 as shown in FIG. 5.

The support member 46 also carries adjacent its upper margin, a transverse member 53 which supports spaced electrical contact brushes 54 and 56, the brushes acting as conduits for electrical power to the electromagnet coils 47 and 51 as will be subsequently described with reference to FIG. 12. The brushes 54 and 56 physically contact the bus bars 29 and 30 respectively. As may be seen in FIG. 5, the rollers 43 are adapted to engage the marginal underside of the inside rail 11b. As shown in FIG. 3, the upper plate 32 of the frame structure 12 has depending from its underside rollers 55 which, as may best be seen in FIG. 5, are adapted to engage the upper face of the track plate 11c when the pallet is in place on the track.

Figure 8:
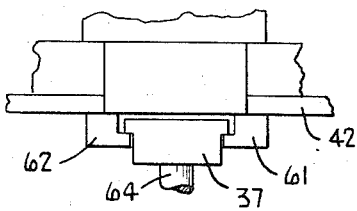
FIG. 8 is a fragmentary side view of the control module shown in FIG. 6 and 7 and illustrating the movable latch structure for securing the module to the frame.

As may best be seen in FIG. 8 the underface of the plate 42 carries flanged blocks 61 and 62 which function as guides for the movable latching member 37, referred to previously with reference to FIG. 7. As may be seen in FIG. 7 the latch member 37 is disposed in a cut away portion of the margin of the plate 42.

Locking and unlocking, reciprocating motion of the latching member 37 is provided by a cam 63 (FIG. 9) which rotates with a shaft 64 which is journalled at the base of the plate 41 and extends downwardly from it, the shaft 64 having a hand grip, sidewardly extending member 64a. Thus with the control module 38 within the frame component of the pallet, the shaft 64 may be manually rotated through a short angular distance causing the movable latch member 37 to advance and engage the stationary latch member 36 carried by the frame member 34 thereby locking the control module to the frame, the movement of the latch member 37 to provide locking engagement being rightward as viewed in FIG. 9.

Figure 9:
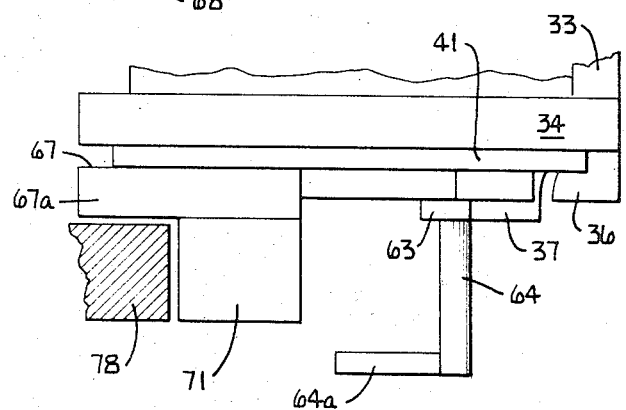
FIG. 9 is a fragmentary, end view of the control module shown in FIG. 6, the view being taken from the right-hand side of FIG. 6.

As will be evident from FIGS. 6, 7 and 9 an elongated bar 67 of resinous material extends lengthwise beneath the plate 41 of the control module. Since motion of the control module on the track structure is in the direction of the arrow 68 in FIG. 7, the portion of the bar 67 identified at 67a is referred to as the trailing section since it protrudes rearwardly behind the plate 41. This rearwardly extending portion 67a of the block 67 has embedded in it a permanent magnet identified at 69. Depending from the block 67 and forming an integral part of it is a further block 71 (FIGS. 7 and 9). As will be evident from FIGS. 6 and 7, the member 71 does not extend beyond the margin of the plate 41 on the rear or trailing side of the control module but does have a portion 71a which extends beyond the plate 41 on the leading or front margin of the plate 41. Embedded within this extending portion 71a is a portion of the control means which takes the form of a magnetic flux responsive switch 72 which is also shown schematically in FIG. 12. Also embedded or potted within the bar 71 is a further portion of the control means taking the form of a magnetic flux responsive switch 73 whose position in the control circuit is indicated in FIG. 12. As may best be seen in FIG. 6, a normally closed switch 74 having a manually operable push button 74a serves as a disconnect switch as will subsequently be explained with reference to FIG. 12. The control means further includes a relay coil 76 (FIG. 12) which when energized operates the double-throw relay switch 77.

A further portion of the control for the pallets takes the form of stop bar assemblies one of which is indicated generally at 78 in FIG. 11. A stop bar is mounted at each of the work stations where the pallets are to be halted. The bars 78 may be spaced around the path of the chain in the track as viewed in FIG. 1. As the pallets move past the stop bars 78, the stop bars will lie within the cut out portion formed at the junction of the members 71 and 67 as will be apparent from FIG. 9. Each of the stop bars may be formed of a length of rectangular aluminum tubing which has potted in it, adjacent its opposite ends, an electromagnet 79 and an electromagnet 80. Also potted within each of the stop bars is an adjustable timer switch 81 which is adapted to open its contact after a pre-selected time interval. The electromagnet 79 may be designated as the entrance end magnet since this electromagnet is encountered by the pallet initially, and the magnet 80 may be identified as the discharge end magnet since, assuming the pallet travels from left to right over the bar 78, as viewed in FIG. 11, the magnet 80 will be the magnet last adjacent the pallet. The circuit for each of the stop bars 78 is shown in FIG. 13 and the electrical power lines 84 and 86 provide current to the electromagnet coil 79 and the electromagnet coil 80, the timer switch being shown schematically at 82. In circuit with these elements is a control switch indicated generally at 83 which is operated remotely according to a desired program for energizing the successive stations, it being understood that each station is provided with a stop bar 78 having a circuit such as that shown in FIG. 13. The stop bar electromagnets, which are stationary, are adapted to cooperate with the magnetic flux responsive switches 72 and 73 carried by the members 71.

In operation, as may best be seen in FIG. 12, with the bars 29 and 30 supplied with 24 volts AC or DC power, the coil 47 of the drive magnet will be energized through the normally closed relay switch 77 and the disconnect switch 74. The drive electromagnet will thus be energized and magnetic flux from the drive magnet core 47b will link the chain 16 which is in linear motion, being driven by the motor 22 and the sprocket 18 as previously described. This will cause the pallet under consideration to move with the chain, carrying a workpiece toward a processing station. Assuming the pallet shown in FIG. 1 moves from left to right as there viewed, and assuming that the primary control element in the form of the stop bar 78 defines the position of a work processing station, as the pallet approaches the stop bar 78, the electromagnet 80 in the stop bar is energized by closure of the switch 83 which is controlled by a remote programming apparatus (not shown). This also energizes the timer 82 so that after a predetermined time interval the switch controlled by the timer will be opened, again deenergizing the electromagnet 80. As the pallet moves so that the magnetic flux responsive switch 73 (FIG. 6) in the control module moves to a position adjacent the magnet 80, the switch 73 will be closed by the action of the electromagnet 80. As may best be seen in FIG. 12, with the closure of switch 73, the relay coil 76 will be energized actuating the relay switch 77 thereby deenergizing the drive magnet coil 47 and energizing the brake magnet coil 51. Upon the energization of the brake magnet coil 51, the cores 51b will link the stationary brake rail 26 (FIG. 5), bringing the pallet to a positive, immediate stop. Where accurate location of the pallet with relation to the station is necessary, conventional tapered locating pins and bushings may be utilized for accurately positioning the pallet, actuation of the locating pin or pins (not shown) also functioning to actuate the disconnect switch 74, releasing the magnetic linking of the pallet to the brake rail and permitting final positioning movement of the pallet.

The timer 82 (FIG. 13) having been set for the desired time at the processing station, opens when this time has elapsed thus deenergizing the electromagnet 79 and 80 in the stop bar 78. This permits the switch 73 to open, deenergizing the relay coil 76 and, through relay switch 77, deenergizing the brake electromagnet 51 and energizing the drive electromagnet 47. Flux linkage of the chain 16 by the electromagnet 47 causes the pallet to again proceed.

It will be noted that the electromagnet 79, at the left-hand end of the stop bar 78 (as viewed in FIG. 11) is also energized when the electromagnet 80 is energized (FIG. 13). The function of electromagnet 79 is to open the switch 73 of a following pallet, holding it out of the processing station which is then occupied by the preceding pallet. When the timer opens, at the ending of the required processing time, as previously mentioned, the electromagnet 79 will be deenergized permitting the trailing pallet to enter the station as the preceding pallet leaves.

The dual electromagnet arrangement in the stop bar provides a means for preventing a following pallet from engaging a preceding pallet as it is halted in a processing station. The permanent magnet 69 (FIG. 6) disposed in the forwardly extending end 67a of each control module also provides a means for halting a trailing pallet should a preceding pallet be stopped for any reason. As a following pallet approaches a stopped pallet, the leading extension 67a on its control module moves into underlying relationship with the rearwardly extending portion 71a of the leading pallet control module. The permanent magnet 69 acts on the switch 72 of the trailing pallet causing it to close, thereby energizing relay 76 (FIG. 12) and deenergizing the drive magnet coil 47 and energizing the brake magnet coil 51 of the trailing pallet. The following pallet is thus brought to a halt without making physical contact with the preceding pallet, the trailing pallet being stopped as a result of its drawing into proximity with the preceding pallet. Should it be necessary to remove a pallet from the track structure, the manual disconnect switch pushbutton 74a (FIG. 6) may be actuated to open the switch 74 releasing the magnetic linkage of the pallet to the track.

Figure 15:
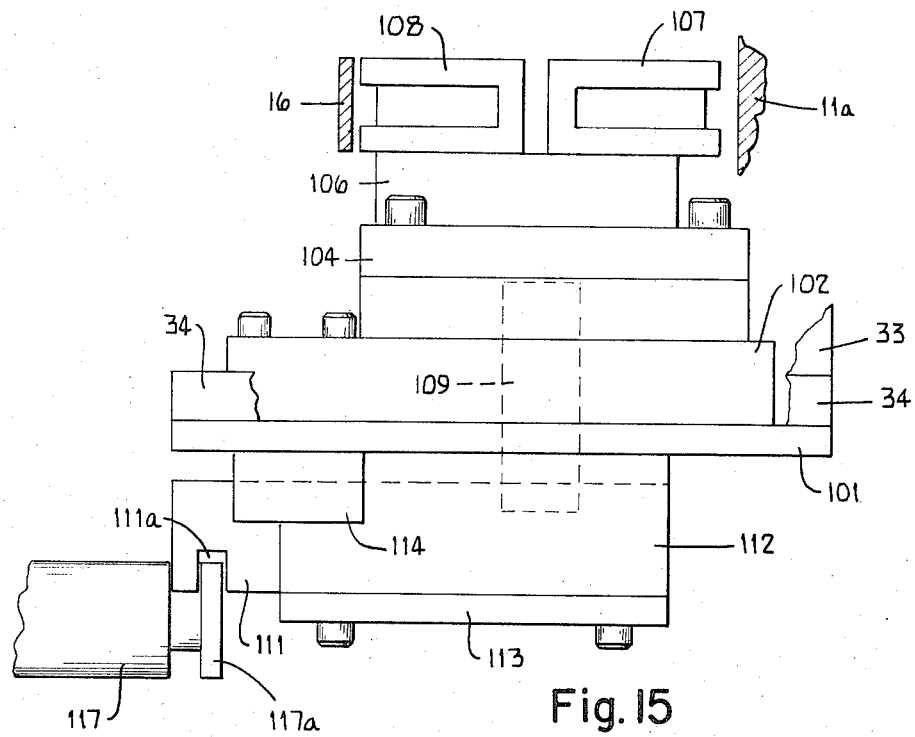
FIG. 15 is a side view of the structure shown in FIG. 14.
Figure 16:
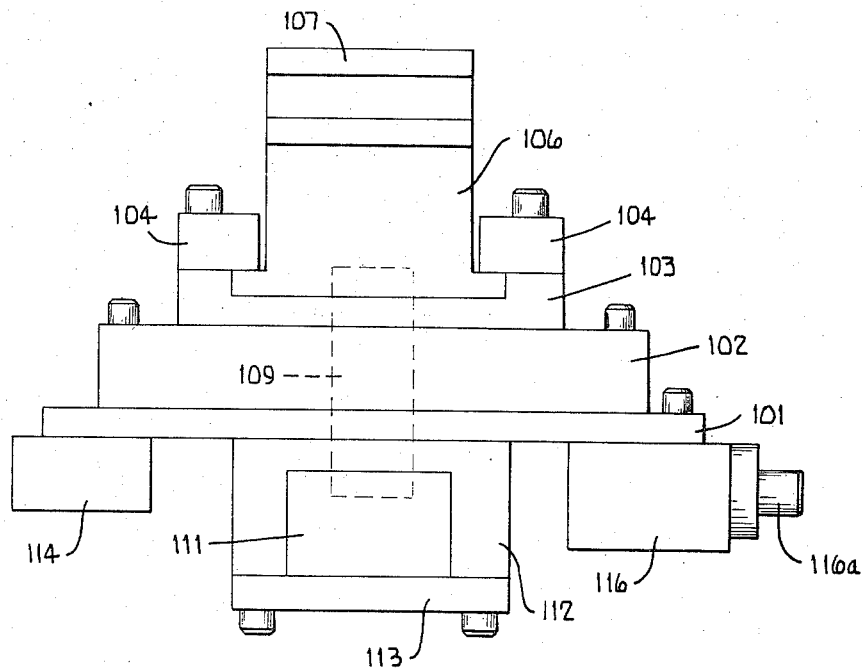
FIG. 16 is an end view of the structure shown in FIGS. 14 and 15, and taken from the right-hand end of FIG. 15.

Referring to FIGS. 14, 15 and 16, a modification of the above identified device utilizing permanent magnets rather than electromagnets will now be described. The control module shown in FIGS. 14, 15 and 16, it will be understood, utilizes the same pallet frame shown in FIG. 3. The permanent magnet control module comprises a base 101 which carries a block 102, on the upper surface of which is fastened a slide-receiving member 103. Overhanging members 104, attached to the upwardly extending marginal portions of the member 103 form a T-shaped, elongated slot which receives a flanged base portion of a slide member 106.

Supported on the upper surface of the slide 106 is a brake magnet 107 and a drive magnet 108. The permanent magnets 107 and 108 are adapted to provide magnetic flux linking the chain 16 and the permeable outer track wall 11a, respectively, when they are closely adjacent to those surfaces. In FIG. 15 the drive magnet 108 is shown closely adjacent the surface of the chain 16 while the magnet 107 is withdrawn from close relationship with the rail 11a.

As may best be seen in FIG. 16 the magnet mounting slide 106 is secured, by means of a connecting pin 109, to a pusher bar 111 which is disposed adjacent the underside of the base plate 101. The pusher bar is longitudinally slidable within a retaining member 112, a cap 113, secured to the member 112, completing the assembly. As may best be seen in FIG. 14, the members through which the connector pin 109 extends are provided with an elongated slot 112, permitting horizontal motion of the connector pin 109 (as viewed in FIG. 14) and thus corresponding motion of the member 106 and of the magnets 107 and 108. The pusher bar 111 serves as a control means for moving the power magnet 108 and the brake magnet 107 into and out of flux-linking relation with the chain 16 and the outside rail portion 11a of the track, respectively.

The base plate 101 is also provided with a rearwardly extending pallet stop 114 (FIG. 16) and adjacent its leading or front margin, the base plate 101 has secured to its underface a conventional fluid dashpot structure 116. The stem member of the dashpot is identified at 116a and is adapted to engage the pallet stop 114 of a preceding pallet, the dashpot action of the member 116 serving to cushion the impact of a trailing pallet upon a preceding pallet.

As may best be seen in FIG. 15, the control means, taking the form of the pusher bar 111 is operated by an actuating piston member 117 whose piston is provided with an enlarged head 117a which extends within a notch formed in the bar 111. It will be understood that the bar 111, and consequently the magnets 107 and 108 will be in their positions shown in FIG. 15 when the piston of the member 117 is withdrawn into the body of the piston member and, when the piston is extended, the bar 111 will move the magnets 108 and 107 rightwardly (as viewed in FIG. 15) to release magnet 108 from the chain 16 and to provide magnetic flux linkage of the magnet 107 with the stationary rail 11a.

In operation, with the magnet 108 in its position of FIG. 15, the pallet on which the magnet is mounted will move with the chain 16. As the pallet move adjacent a station at which it is to be halted, a stop pin (not shown) may be actuated by a suitable control means so as to extend into engagement with the pin 116a of the pallet member 116. The pallet will advance at a decreased rate as the dashpot member 116 performs its function and as the pallet moves into position the push bar 111 will move into slot-engaging position with the piston of the actuator 117. When the dashpot 116 reaches the limit of its travel, the piston 117 is actuated by pressurizing one side of its movable member, thereby moving the push bar 111, and consequently the magnets 108 and 107 rightwardly as viewed in FIG. 15. This releases the pallet from the moving chain 16 and clamps it magnetically to the stationary rail 11a. When movement of the pallet is to resume, the actuator 117 is controlled so as to move its member 117a leftwardly as viewed in FIG. 15 thereby again magnetically clamping the pallet to the moving chain 16 and releasing it from the stationary rail 11a. In this form of the pallet structure, as previously mentioned, when a pallet is stopped for any reason on the track an approaching pallet will be brought to a halt by engagement of the member 116a of its dashpot with the pallet stop 114 of the preceding pallet. The action of the dashpot 116 slows the following pallet to a stop without appreciable impact shock.

From the foregoing it will be evident that the primary form of the present invention provides for the proximity stopping or halting of a following pallet before it engages the preceding pallet on the track. The magnetic traction and magnetic braking action provides positive control of the pallets. Positive drive is provided for the pallets and yet these may have relatively low slip characteristics for improved operator safety should anything block the motion of the pallet. The drive chain and low voltage bus bars are protected and enclosed by the rail structure, the chain being thus protected against jamming by objects inadvertently thrust into it. The 24 volt electrical system necessary for the structure may be either AC or DC thereby further providing improved safety for the operators. The drive components are characterized by long operating life and low maintenance and the structure, in general, has a minimum of moving parts. Manual or automatic stop members can be added or removed from the assembly without disassemblying or altering the track structure. The pallets can be made to travel in relatively complicated, small radius paths. Because the brake magnet on each pallet is energized simultaneously with he deenergization of the drive magnet, there is no inertial build up or impact transfer between pallets when they collet in a given area of the track. The structure operates at a low noise level and the pallet size can be varied from relatively small to relatively large size. By utilizing multiple chains, moving at differing speeds, each pallet having multiple drive magnets with proper controls, greatly increased flexibility of movement of the pallets may be obtained.

The foregoing is an explanation of the principle of the invention and illustrates what is not considered to represent its best embodiment.

I claim:

1. A non-synchronous transfer system for moving articles successively between a plurality of stations at which operations are performed on the articles, said system including a stationary track, a plurality of stations mounted in spaced relation on said track, an endless flexible magnetically permeable member, means for supporting said flexible member adjacent said track for continuous linear motion between said stations and power means for providing said motion to the flexible member, an elongated magnetically permeable stationary member disposed adjacent said flexible member and generally coextensive therewith, pallets adapted to support said articles and mounted for motion along said track generally parallel to and closely adjacent both said flexible and stationary members, and magnetic means supported on each of said pallets for selectively providing flux linkage with either said flexible member or said stationary member for positively engaging said flexible member or said stationary member and positively disengaging said flexible member or said stationary member at predetermined ones of said stations along the path of travel of said flexible member, and control means mounted on said track at said stations for shifting the flux linkage between said members to thereby permit said pallets to be moved with said flexible member between said stations and braked to a halt adjacent thereto.

2. A non-synchronous transfer system as claimed in claim 1 in which said flexible member takes the form of an endless chain and its path of travel is a closed loop.

3. A non-synchronous transfer system as claimed in claim 1 in which said magnetic means takes the form of a first electromagnet adapted to generate magnetic flux when energized which links said flexible member and a second electromagnet adapted to generate magnetic flux when energized which links said stationary member.

4. A non-synchronous transfer system as claimed in claim 3 in which a leading portion of each of said pallets carries a magnetic flux responsive proximity control element adapted when actuated to deenergize said first electromagnet and energize said second electromagnet, a trailing portion of each of said pallets carrying auxiliary magnetic means for actuating the said proximity control element of a following pallet to thereby brake the following pallet as it moves into proximity with the preceding pallet and preventing physical contact between said pallets.

5. A non-synchronous transfer system as claimed in claim 4 in which each of said auxiliary magnetic means is a permanent magnet.

6. A non-synchronous transfer system as claimed in claim 5 in which each of said proximity control element takes the form of an electrical switch adapted to be actuated by the said permanent magnet carried by the next preceding pallet.

7. A non-synchronous transfer system as claimed in claim 4 in which each of said pallets carries a magnetic flux responsive primary control element adapted when actuated to deenergize said first electromagnet and energize said second electromagnet, said station-mounted control means including electrical control elements mounted adjacent each of said stations and adapted when energized to actuate said pallet-carried primary control elements to thereby halt selected pallets at selected ones of said stations dependent upon the sequence and timing of the energization of said station-mounted control elements.

8. A non-synchronous transfer system as claimed in claim 7 in which said station-mounted electrical control elements are electromagnets.

9. A non-synchronous transfer system as claimed in claim 8 in which each of said primary control elements takes the form of an electrical switch adapted to be actuated by magnetic flux generated by said station-mounted electromagnets.

10. A non-synchronous transfer system as claimed in claim 7 in which an auxiliary control element is mounted on said track adjacent to but spaced upstream of each of said station-mounted control elements and is adapted when energized to actuate the proximity control element of a following pallet to maintain a space interval between the pallet at said station and the next following pallet.

11. A pallet for use in a transfer system, said pallet having attached to it a control assembly, said pallet being adapted for mounting on a track providing a predetermined path of movement for the pallet, said control assembly including first and second electromagnets adapted to positively engage or disengage an adjacent endless flexible moving magnetically permeable member and to correspondingly disengage or engage an adjacent stationary magnetically permeable member, and control means electrically connected in circuit with said electromagnets and forming a part of said control assembly for controlling energization of said electromagnets.

12. A pallet as claimed in claim 11 in which said control means includes a magnetic flux responsive switch positioned adjacent the front or leading margin of said pallet.

13. A pallet as claimed in claim 12 in which said control means includes a permanent magnet positioned adjacent the rear or trailing margin of said pallet and adapted to cooperate with the front flux responsive switch of a following pallet.

14. A pallet as claimed in claim 13 in which said control means further includes an additional magnetic flux responsive switch positioned intermediate the leading and trailing margins of said pallet.

15. A pallet as claimed in claim 14 in which said control means further includes a manually operable switch adapted when operated to deenergize both said first and second electromagnets.

* * * * *